Jan. 27, 1931.  W. W. POTTER  1,790,440
MACHINE TOOL
Filed Nov. 14, 1927
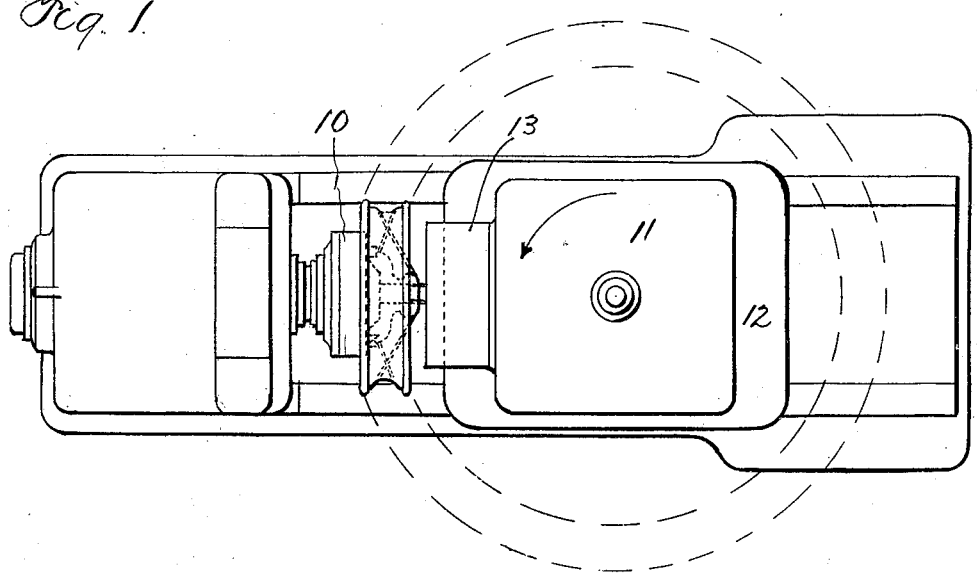
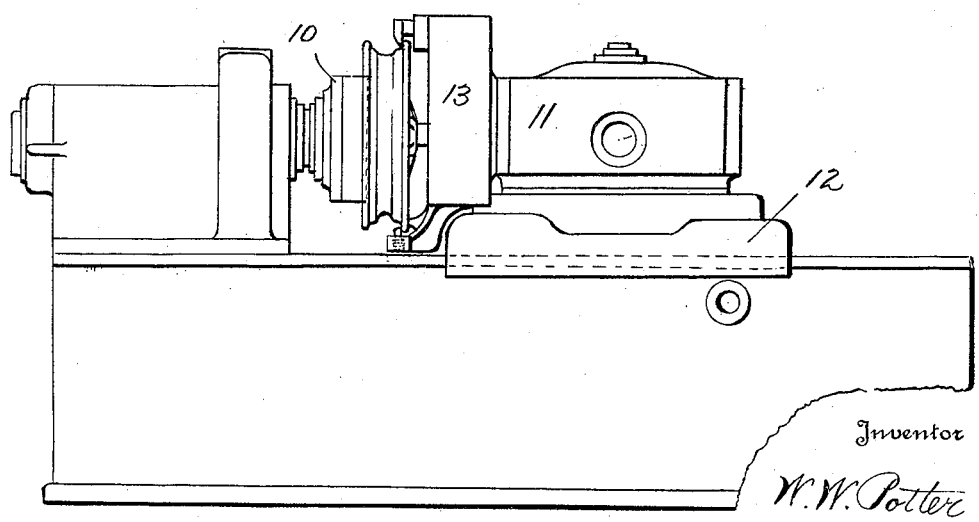
Inventor
W. W. Potter
By Chas. J. Williamson
Attorney Patented Jan. 27, 1931

1,790,440

UNITED STATES PATENT OFFICE

WILLIAM WALLACE POTTER, OF PAWTUCKET, RHODE ISLAND

MACHINE TOOL

Application filed November 14, 1927. Serial No. 233,098.

Turret lathes previous to the present invention have such construction of the turret with reference to its slide that only by objectionably increasing the height of the turret and work-spindle could certain work of large bulk be handled in a turret lathe, and it is very desirable that it be possible to handle such work in a turret lathe. Thus, by way of illustration, it is desirable to turn the brake hubs or rings of automobile wheels after the wheel and hub are put together. The diameter of the wheel rim is so great as to create difficulties which if sought to be solved with the ordinary turret construction would compel the lifting of the spindle and turret to an objectionable height to enable the indexing operation of the turret to be performed. The object of my invention is to enable the machine to handle such large work while maintaining the height of the machine as heretofore. My invention consists in whatever is described by or is included within the terms or scope of the appended claim.

In the drawings:

Fig. 1 is a top plan view of a turret lathe embodying my invention; and

Fig. 2 is a side elevation thereof.

In dealing with large or heavy work which my invention contemplates, the thing creating the difficulty is the matter of indexing the turret because of collision between tools or work carried by the turret with the turret slide by reason of the projection or overhang downwardly of the tool or work. The solution that would naturally occur for this situation would be to raise the turret and spindle sufficiently high above the slide as to result in clearance of the slide during the indexing operation. That, however, is an objectionable solution of the problem. By my invention the problem is solved by increasing or enlarging the diameter of the turret with reference to the turret slide, so that any downward overhang or projection of parts carried by the turret will describe a circular path in the indexing operation entirely outside of the slide.

Describing what is shown in the drawings. the turret lathe shown is of ordinary construction in that it has a horizontal spindle with a chuck, 10, a turret, 11, mounted to rotate on a vertical axis upon a slide, 12, which by mechanism not necessary to be shown and described is reciprocated to move the turret towards and from the chuck. Nor is it necessary to show and describe the turret revolving or indexing mechanism. The diameter of the turret is greater than heretofore in that and to the extent that when, as shown in the drawings, it has attached to it an automobile wheel rim, the downward projection or overhang of the rim will describe a circle during indexing which will entirely clear all sides of the slide. The work-piece is attached to one side or face of the turret by a suitable holder, 13. Since the workpiece is carried by the turret the cutting tool is attached to the chuck.

What I claim is:

A turret lathe comprising a rotary spindle having a chuck, a turret mounted for revolution to present each of its plurality of sides into co-operative work relation with the chuck and a slide on which the turret is mounted to revolve, the turret having such diameter that a part carried thereby and having an overhang at the side of the slide will during indexing describe a path wholly to one side of all side surfaces of the slide, the turret having vertical sides to anyone of which said part carried thereby may be attached with a portion extending vertically downward and the axis of the revolution of the turret being vertical and a horizontal spindle towards and from which the turret slide moves.

In testimony whereof I hereunto affix my signature.

WILLIAM WALLACE POTTER.